(12) United States Patent
Fukasawa

(10) Patent No.: US 8,472,830 B2
(45) Date of Patent: Jun. 25, 2013

(54) SERIAL DUPLEX IMAGE FORMING SYSTEM FOR DUPLEX PRINTING AND DISPLAY OF ASSIGNMENT OF LOGICAL PAGES

(75) Inventor: Hajime Fukasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 346 days.

(21) Appl. No.: 12/868,264

(22) Filed: Aug. 25, 2010

(65) Prior Publication Data
US 2011/0069986 A1     Mar. 24, 2011

(30) Foreign Application Priority Data

Sep. 24, 2009   (JP) .................................. 2009-219471
Mar. 18, 2010   (JP) .................................. 2010-062446

(51) Int. Cl.
*G03G 15/00*   (2006.01)

(52) U.S. Cl.
USPC ............................... 399/81; 399/82; 399/306

(58) Field of Classification Search
USPC ............. 399/81, 82, 306, 364, 407; 358/1.15
See application file for complete search history.

(56) References Cited

U.S. PATENT DOCUMENTS

| 5,548,390 | A | 8/1996 | Sugisaki et al. |
| 6,865,355 | B2 * | 3/2005 | Burkes et al. .................... 399/85 |
| 7,444,094 | B2 * | 10/2008 | Narita et al. .................... 399/82 |
| 7,912,415 | B2 * | 3/2011 | Shiozawa ...................... 399/341 |
| 7,991,346 | B2 * | 8/2011 | Kida et al. .................... 399/405 |
| 2004/0184105 | A1 * | 9/2004 | Ferlitsch ........................ 358/2.1 |
| 2008/0186526 | A1 * | 8/2008 | Kidani et al. ................ 358/1.13 |
| 2008/0309962 | A1 * | 12/2008 | Smith .......................... 358/1.15 |
| 2009/0273806 | A1 * | 11/2009 | Nishikawa et al. .......... 358/1.15 |

FOREIGN PATENT DOCUMENTS

| JP | A-7-237336 | 9/1995 |
| JP | A-10-222328 | 8/1998 |
| JP | A-2003-312083 | 11/2003 |

* cited by examiner

*Primary Examiner* — Robert Beatty
(74) *Attorney, Agent, or Firm* — Oliff & Berridge, PLC

(57) ABSTRACT

An image forming device including a first image forming unit, a second image forming unit, an assignment unit and a reporting unit is provided. The first image forming unit forms images on one face of a recording paper. The second image forming unit receives the recording paper from the first image forming unit and forms images on the other face of the received recording paper, and performs image formation of a type that differs from the image formation performed by the first image forming unit. The assignment unit assigns logical pages of image data of a printing target to the first image forming unit or the second image forming unit. The reporting unit reports image forming information indicating what type of image formation is to be performed on each of the assigned logical pages of the image data.

16 Claims, 15 Drawing Sheets

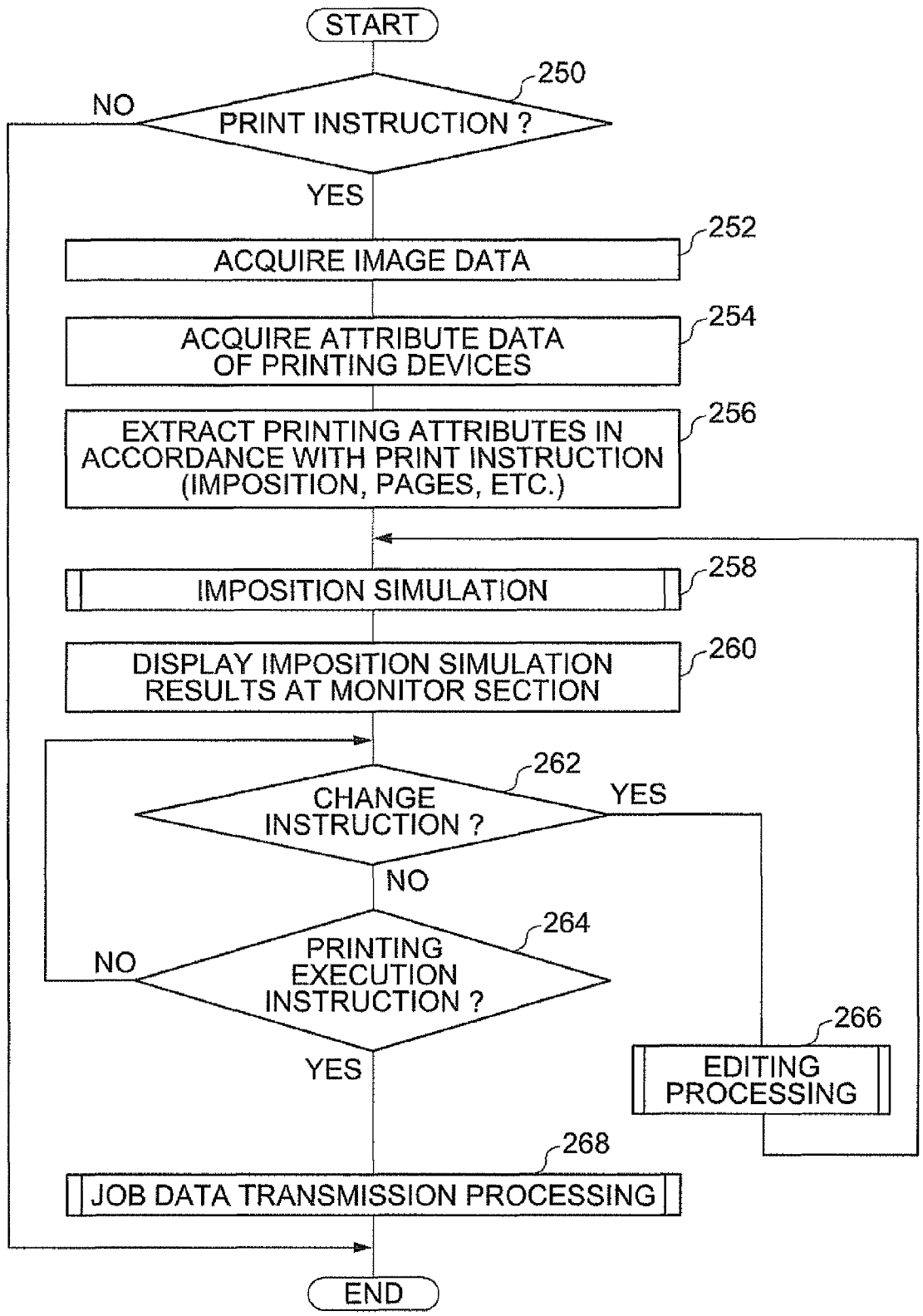

SERIAL DUPLEX IMAGE FORMING SYSTEM FOR DUPLEX PRINTING AND DISPLAY OF ASSIGNMENT OF LOGICAL PAGES

CROSS-REFERENCE TO RELATED APPLICATION

This application is based on and claims priority under 35 USC 119 from Japanese Patent Application No. 2009-219471 filed on Sep. 24, 2009 and Japanese Patent Application No. 2010-062446 filed on Mar. 18, 2010.

BACKGROUND

1. Technical Field

The present invention relates to an image forming device, an image forming system, a computer readable medium, and an information processing device.

2. Related Art

There are cases of structures that are capable of two-sided printing for cases of cut sheet as well as of continuous paper, in which printing devices are adjacently directly connected and the paper is conveyable between the plural machines.

SUMMARY

An image forming device relating to an aspect of the present invention is an image forming device including: a first image fowling unit that forms an image at one face of a recording paper; a second image forming unit that receives the recording paper from the first image forming unit and forms an image at another face of the received recording paper, and that performs image formation of a type that differs from image formation performed by the first image forming unit; an assignment unit that assigns each of logical pages of image data of a printing target to one of the first image forming unit and the second image forming unit; and a reporting unit that reports image fanning information indicating what type of image formation is to be performed on the each assigned logical page of the image data.

BRIEF DESCRIPTION OF THE DRAWINGS

An exemplary embodiment of the present invention will be described in detail based on the following figures, wherein:

FIG. 15 is a control flowchart illustrating the flow of the imposition simulation, which is executed by the CPU of the information processing device relating to the second exemplary embodiment.

DETAILED DESCRIPTION

—First Exemplary Embodiment—

Figure 1:
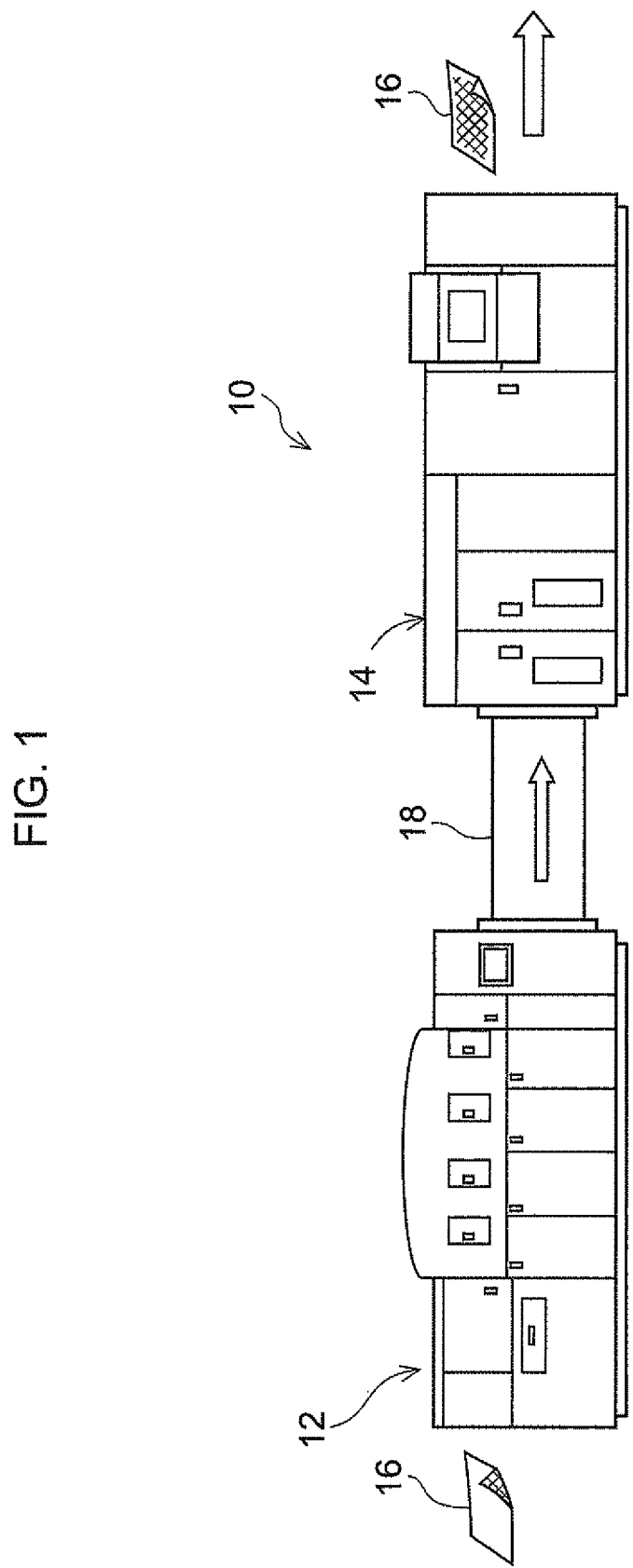
FIG. 1 is a schematic diagram of a printing system relating to a first exemplary embodiment.

FIG. 1 illustrates a printing processing system 10 relating to the first exemplary embodiment. The printing processing system 10 of the first exemplary embodiment includes two printing devices 12 and 14.

Hereinafter, the meaning of the term "printing" includes processing that prints an image-forming material such as toner, ink or the like on a recording paper such as cut sheet, continuous paper or the like. The meaning of the term "image forming" includes processing that converts printing data of a printing target inputted into a printer to data in a bitmap format, and is used for what is known as rasterization.

The two printing devices 12 and 14 are in a "linked configuration". This forms (prints) an image on one face (for example, a front (upper) face) of recording paper 16 at the one printing device 12, then feeds out the recording paper to the other printing device 14, and forms (prints) an image on the other face (for example, a rear (back) face) of the recording paper 16 received by the other printing device 14. In cases of cut sheet as well as of continuous paper, a structure capable of two-sided printing may similarly be formed by directly connecting two printers. The printing devices 12 and 14 are configured as electrophotography printers, but the printing devices 12 and 14 may be configured as inkjet printers.

A relative positional relationship of the one printing device 12 and the other printing device 14 is that, with reference to a conveyance direction of the recording paper 16, the one printing device 12 (hereinafter referred to as the upstream printing device 12) is disposed at the upstream side and the other printing device 14 (hereinafter referred to as the downstream printing device 14) is disposed at the downstream side. A conveyance section 18 for transferring the recording paper 16 is provided between the upstream printing device 12 and the downstream printing device 14.

If, for example, the printing faces of the upstream printing device 12 and the downstream printing device 14 during conveyance are both the same face (for example, the upper face), the conveyance section 18 must include a function for inverting the recording paper 16 front-to-back.

Numerous widely known technologies are available as mechanisms for performing this inversion. As a representative example, there is a mechanism in which a rotation axis of a roller at a reference position is inclined three-dimensionally, in both plan view and side view, relative to a case in which the axial direction thereof is in a transverse direction during conveyance of the recording paper.

The recording paper 16 wound round this roller is inverted front-to-back. In the present case, the conveyance direction of the recording paper 16 is changed. Therefore, the upstream printing device 12 and the downstream printing device 14 must have a relative positional relationship with one another that matches the change in conveyance direction.

The upstream printing device 12 of the first exemplary embodiment is used as an example of a color printer that is capable of color printing, and handles color images. The downstream printing device 14 is used as a printer that is not capable of color printing but only capable of black-and-white printing, and is specifically for black and white images.

In other words, the printing processing system 10 of the first exemplary embodiment is a "different-machine linked configuration", and color images may be printed at one face of the recording paper 16. By contrast, color printing is not performed on the other face of the recording paper 16 but black-and-white printing is performed.

Now, logical pages 16R are units into which a defined page is divided by a user. For example, n (n being an integer of at least 2) pages may be printed as the logical pages 16R at the front face of the recording paper 16. This may be referred to as "n-up"; for example, if n=2, as "2-up".

In attribute data, there may be a designation of what is known as imposition settings, with which plural pages of the logical pages 16R are disposed at the front face and rear face of the recording paper 16. Here, even in the same image data, a logical page 16R may be disposed at either of the front face and rear face of the recording paper, depending on the imposition settings.

In the first exemplary embodiment, when print request data is received, from attribute data thereof, the logical pages 16R are assigned to the recording paper 16, what kind of images are to be formed in the assigned logical pages is reported, and the possibility of printing as designated at the printing processing system 10 is determined.

Figure 2:
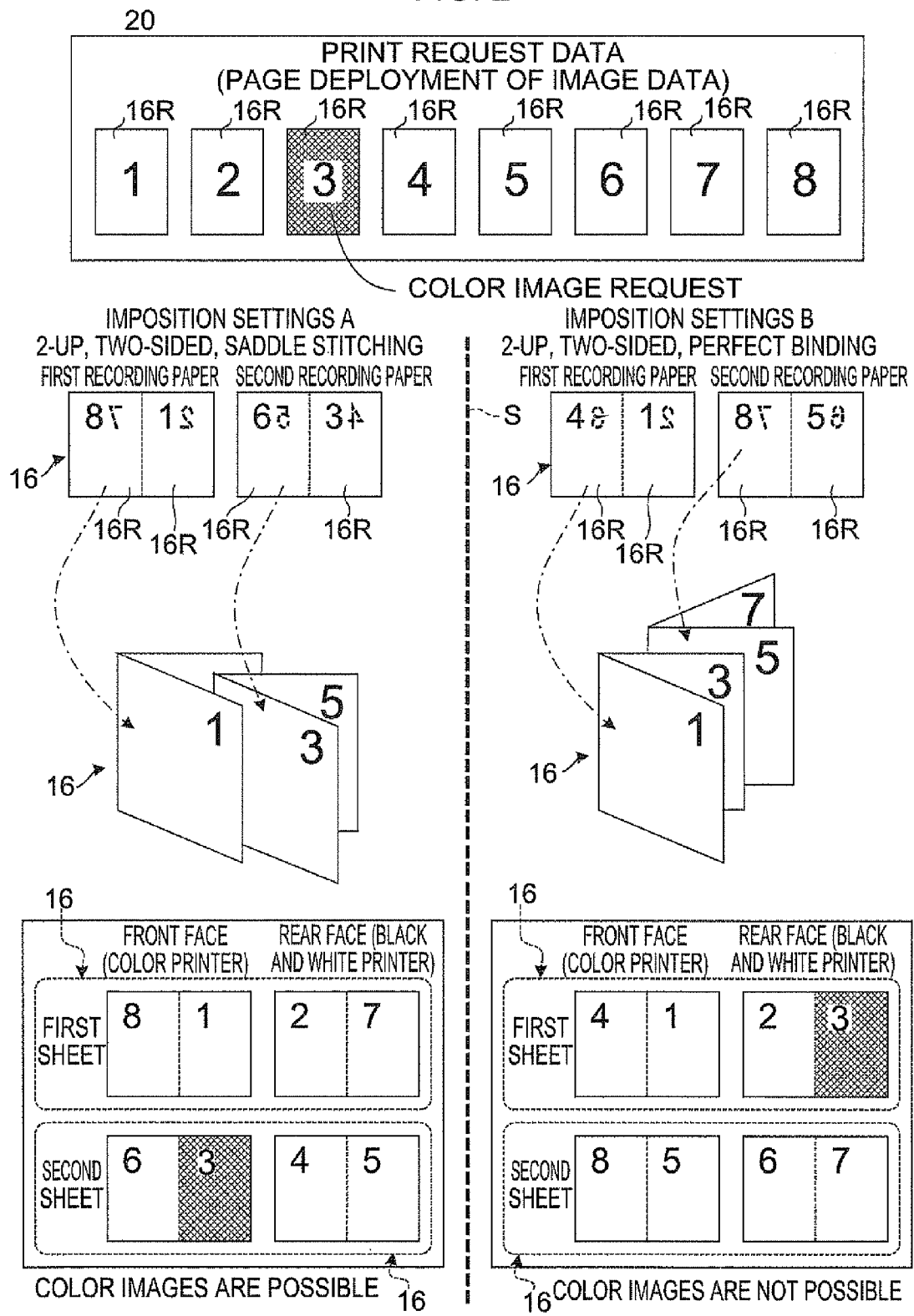
FIG. 2 is a flow diagram illustrating a procedure of assigning logical pages in accordance with differences in imposition settings relating to print request data, relating to the first exemplary embodiment.

Assignment of the logical pages 16R in accordance with differences in the imposition settings relating to the print request data is described on the basis of FIG. 2.

All eight of the logical pages 16R are configured as print request data 20. This is illustrated at the top of FIG. 2. Of the logical pages 16R, the third page has color image data.

The left side of FIG. 2, as bounded by the chain line S at the middle, is imposition settings (hereinafter referred to as imposition settings A), for implementing 2-up (an instruction to print two pages of the logical pages 16R on one sheet of the recording paper 16), two-sided (an instruction to print on the front face and rear face of the recording paper 16), and saddle stitching (an instruction for book making in a form in which one of the recording paper 16 encloses another of the recording paper 16).

The right side of FIG. 2, as bounded by the chain line S at the middle, is imposition settings (hereinafter referred to as imposition settings B), for implementing 2-up (an instruction to print two pages of the logical pages 16R on one sheet of the recording paper 16), two-sided (an instruction to print on the front face and rear face of the recording paper 16), and perfect binding (an instruction for book making in a form in which the recording papers 16 are superposed with one another).

—Imposition Settings A—

With imposition settings A, a 'page 1' of the logical pages 16R is printed at the forward-facing right side of the front face of a first recording paper 16, and a 'page 8' of the logical pages 16R is printed at the forward-facing left side. A 'page 2' of the logical pages 16R is printed directly behind page 1 on the rear face of this first recording paper 16, and a 'page 7' of the logical pages 16R is printed directly behind page 8.

Also with imposition settings A, a 'page 3' of the logical pages 16R is printed at the forward-facing right side of the front face of a second recording paper 16, and a 'page 6' of the logical pages 16R is printed at the forward-facing left side. A 'page 4' of the logical pages 16R is printed directly behind page 3 on the rear face of this second recording paper 16, and a 'page 5' of the logical pages 16R is printed directly behind page 6.

Thus, all of the logical pages 16R (from page 1 to page 8) are printed on two of the recording papers 16, and book making is performed in accordance with the saddle stitching instruction. As illustrated in the lower area to the left side of the chain line in FIG. 2, page 3 of the logical pages 16R is made to correspond with the upstream printing device 12 (the color printer), and therefore page 3 is printed in color as requested.

—Imposition Settings B—

With imposition settings B, page 1 of the logical pages 16R is printed at the forward-facing right side of the front face of a first recording paper 16, and page 4 of the logical pages 16R is printed at the forward-facing left side. Page 2 of the logical pages 16R is printed directly behind page 1 on the rear face of this first recording paper 16, and page 3 of the logical pages 16R is printed directly behind page 4.

Also with imposition settings B, page 5 of the logical pages 16R is printed at the forward-facing right side of the front face of a second recording paper 16, and page 8 of the logical pages 16R is printed at the forward-facing left side. Page 6 of the logical pages 16R is printed directly behind page 5 on the rear face of this second recording paper 16, and page 7 of the logical pages 16R is printed directly behind page 8.

Thus, all of the logical pages 16R (from page 1 to page 8) are printed on two of the recording papers 16, and book making is performed in accordance with the perfect binding instruction. As illustrated in the lower area to the right side of the chain line in FIG. 2, page 3 of the logical pages 16R is matched up with the downstream printing device 14 (the black-and-white printer), and therefore page 3 is not printed in color, which is not as requested.

In the first exemplary embodiment, even though the original print request data 20 is the same as mentioned above, the logical pages 16R for which color printing is instructed are switched to be printed in color or printed in black and white in accordance with the designated imposition settings (A or B).

Therefore, as illustrated at the bottom part of FIG. 2, a display is implemented such that a user may check how the logical page 16R with color data is to be printed.

Figure 3:
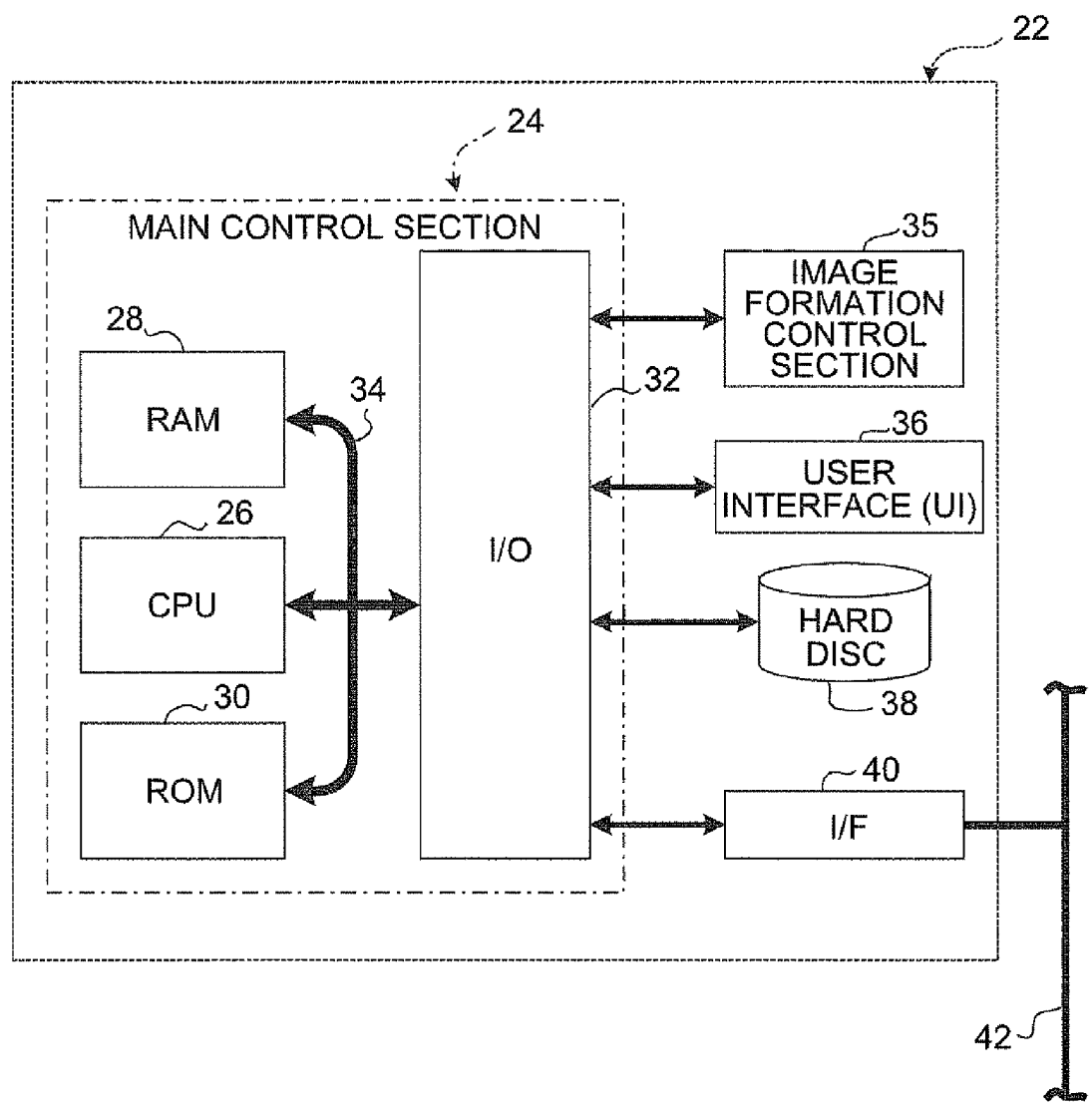
FIG. 3 is a control block diagram illustrating hardware resources of a control system of an upstream printing device relating to the first exemplary embodiment.

FIG. 3 is a block diagram of a printing processing control section 22 of the upstream printing device 12 and downstream printing device 14 of the first exemplary embodiment. The upstream printing device 12 and the downstream printing device 14 each includes the printing processing control section 22 illustrated in FIG. 3. Because the printing processing control sections 22 are the same as one another, the printing processing control section 22 of the printing device 12 is described here but no description is given of the printing processing control section of the printing device 14.

As is illustrated in FIG. 3, the printing processing control section 22 includes a main control section 24. The main control section 24 includes a CPU 26, a RAM 28, a ROM 30, an I/O (input/output section) 32, and a bus 34 connecting the above, such as a data bus, a control bus or the like.

The CPU 26 executes predetermined processing on the basis of programs stored in storage devices such as the RAM 28 and the ROM 30 or the like, and controls operations of the main control section 24.

An image processing program relating to the first exemplary embodiment includes steps that are executed by a computer. That is, the hardware structure example of the main control section 24 described above is realized by a computer, and the program relating to the first exemplary embodiment includes steps that are executed by this computer. Herein, the image processing program of the first exemplary embodiment may be recorded on a recording medium such as a CD-ROM or the like, or may be transmitted through a network.

An image formation control section 35 for controlling and administering processing systems for image formation, such as a conveyance system, a scanning exposure system, a development system and the like, is connected to the I/O 32.

The printing processing control section 22 may have a structure in which the image formation control section 35 is directly connected to the bus 34 rather than the I/O 32. Control relating to image formation is collected in the printing processing control section 22. However, a structure is possible in which this control is executed by the main control section 24.

Figure 4:
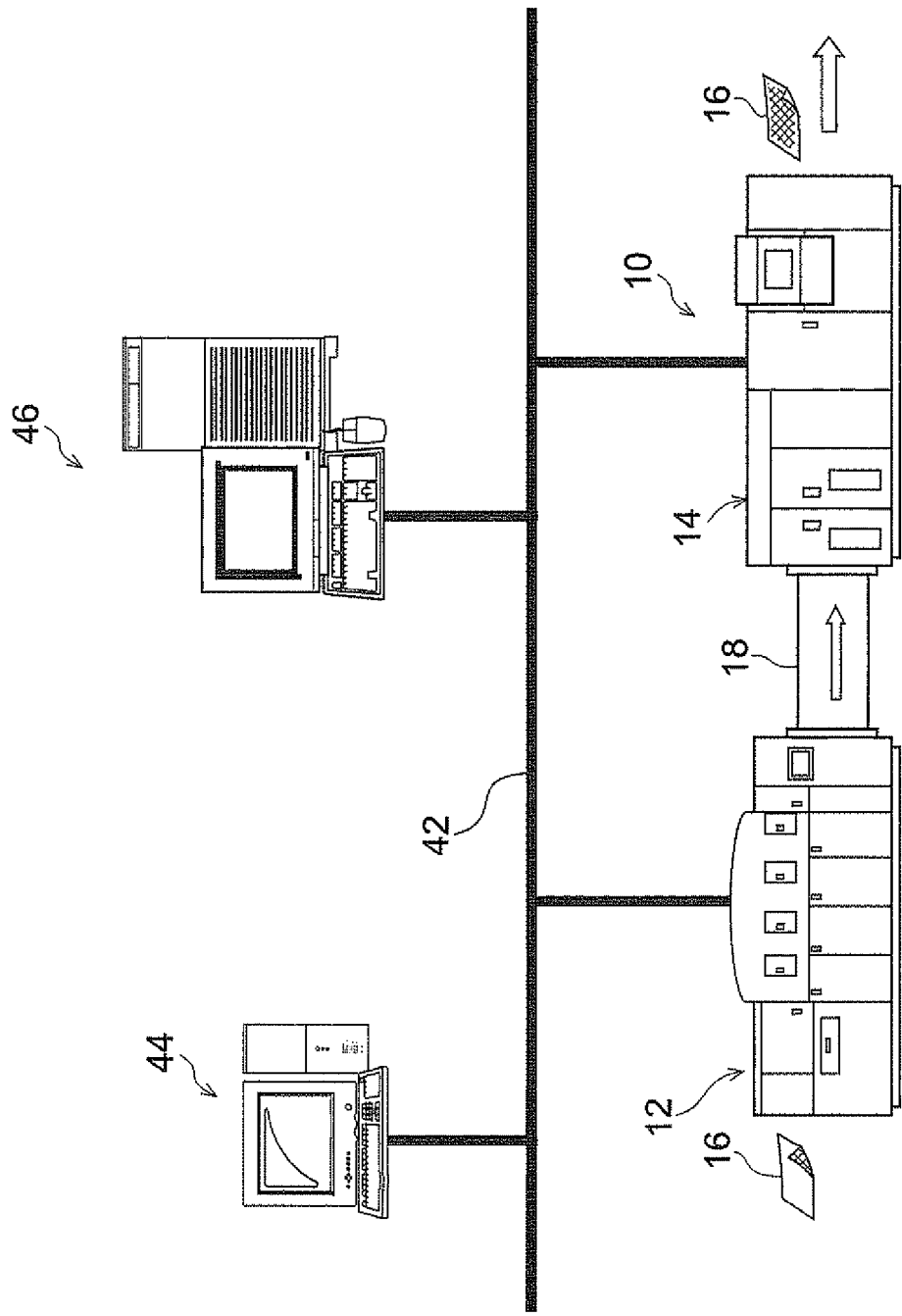
FIG. 4 is a schematic diagram of a case in which the printing system relating to the first exemplary embodiment is connected to a communications network.

A UI (user interface) 36 is connected to the I/O 32. The UI 36 has the functions of receiving input instructions from a user and reporting information relating to image forming processing to the user. A hard disc 38 is also connected to the I/O 32, and the I/O 32 is connected to a communications network 42 via an interface (I/F) 40. Print request data may be inputted to the printing processing control section 22 via the communications network 42. For example, as illustrated in FIG. 4, a communication circuit system may be constructed in which a terminal device 44 that transmits the print request data 20 and/or a server 46 that collects and administers the print request data 20 are connected to the communications network 42 to which the printing processing system 10 relating to the first exemplary embodiment is connected.

Figure 5:
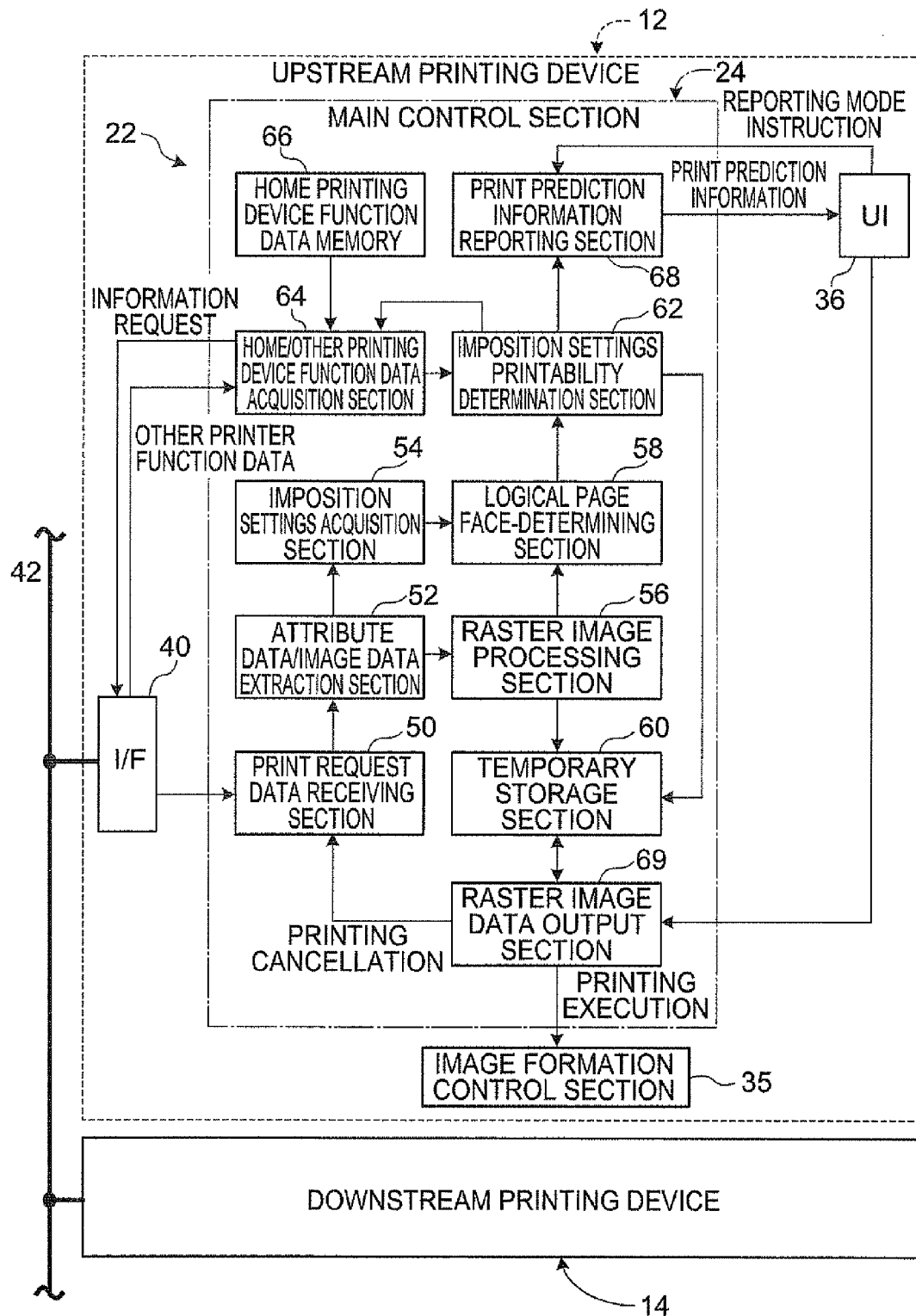
FIG. 5 is a functional block diagram, of an image processing control section relating to the first exemplary embodiment, for determining a possibility of executing image formation at the upstream printing device and a downstream printing device on the basis of imposition information.

FIG. 5 illustrates functional blocks of the printing processing control section 22, for determination control that determines a possibility of execution at the upstream printing device 12 and downstream printing device 14 on the basis of the imposition information in the attribute data that is included in the print request data as illustrated in FIG. 2.

The I/F 40 is connected to a print request data receiving section 50 of the main control section 24. The print request data 20 that is requested via the communications network 42 is received by this print request data receiving section 50.

The print request data receiving section 50 is connected to an attribute data/image data extraction section 52. At the attribute data/image data extraction section 52, attribute data and image data contained in the print request data are extracted. The attribute data/image data extraction section 52 is connected to each of an imposition settings acquisition section 54 and a raster image processing section 56.

Of the attribute data extracted by the attribute data/image data extraction section 52, the imposition settings is sent to the imposition settings acquisition section 54. Meanwhile, the attribute data and image data extracted by the attribute data/image data extraction section 52 are sent to the raster image processing section 56.

The imposition settings acquired by the imposition settings acquisition section 54 is sent to a logical page face-determining section 58.

Raster image processing that converts the image data to image data for when printing (for example, bitmap data or the like) on the basis of the attribute data is implemented by the raster image processing section 56, and the converted data is stored in a temporary storage section 60.

The data that has been subjected to conversion processing by the raster image processing section 56 is also sent to the logical page face-determining section 58.

At the logical page face-determining section 58, whether or not each of the logical pages 16R assigned to the front and rear faces of the recording paper 16 is to be printed in color when the recording paper 16 is actually printed is determined, and determination data is sent to an imposition settings printability determination section 62.

A home/other printing device function data acquisition section 64 is connected to the imposition settings printability determination section 62. At the home/other printing device function data acquisition section 64, function data of the home printing device (that is, the upstream printing device 12) is acquired by reading from a home printing device function data memory 66, in response to a request from the imposition settings printability determination section 62. In addition, function data of an other printing device (that is, the downstream printing device 14) is acquired by the home/other printing device function data acquisition section 64 by communications with the printing device 14 via the I/F 40 and the communications network 42. This function data of the printing device 14 may be stored in advance at the printing device 12, at a setup stage. Alternatively, rather than using the communications network 42, the function data may be read using a communications cable that directly connects the printing device 12 with the printing device 14.

The function data acquired by the home/other printing device function data acquisition section 64 is sent to the imposition settings printability determination section 62. Hence, with the function data, the imposition settings printability determination section 62 determines whether each logical page 16R can match up with either of the printing devices (the upstream printing device 12 and the downstream printing device 14), and determines the possibility of handling the print request. More specifically, it is determined whether or not the logical pages 16R for which color images are requested match up with the downstream printing device 14.

The results of determination by the imposition settings printability determination section 62 are sent to a print prediction information reporting section 68. The print prediction information reporting section 68 is connected to the UI 36. In this case, an example in which the print prediction information reporting section 68 is connected to the UI 36 of the printing device 12 is illustrated. However, it may be connected to a UI of the printing device 14, and may be connected over the communications network 42 of FIG. 4 to a UI of the terminal device 44, the server 46 or the like. The print prediction information reporting section 68 may be connected to multiple user interfaces.

If a selection signal for selecting report contents relating to the print prediction information has been sent to the print prediction information reporting section 68, the UI 36 reports print prediction information in accordance with the selection signal. If no selection signal has been received, print prediction information that is specified by default in the print prediction information reporting section 68 is reported.

Modes of reporting of the print prediction information are broadly divided into two categories.

Figure 6:
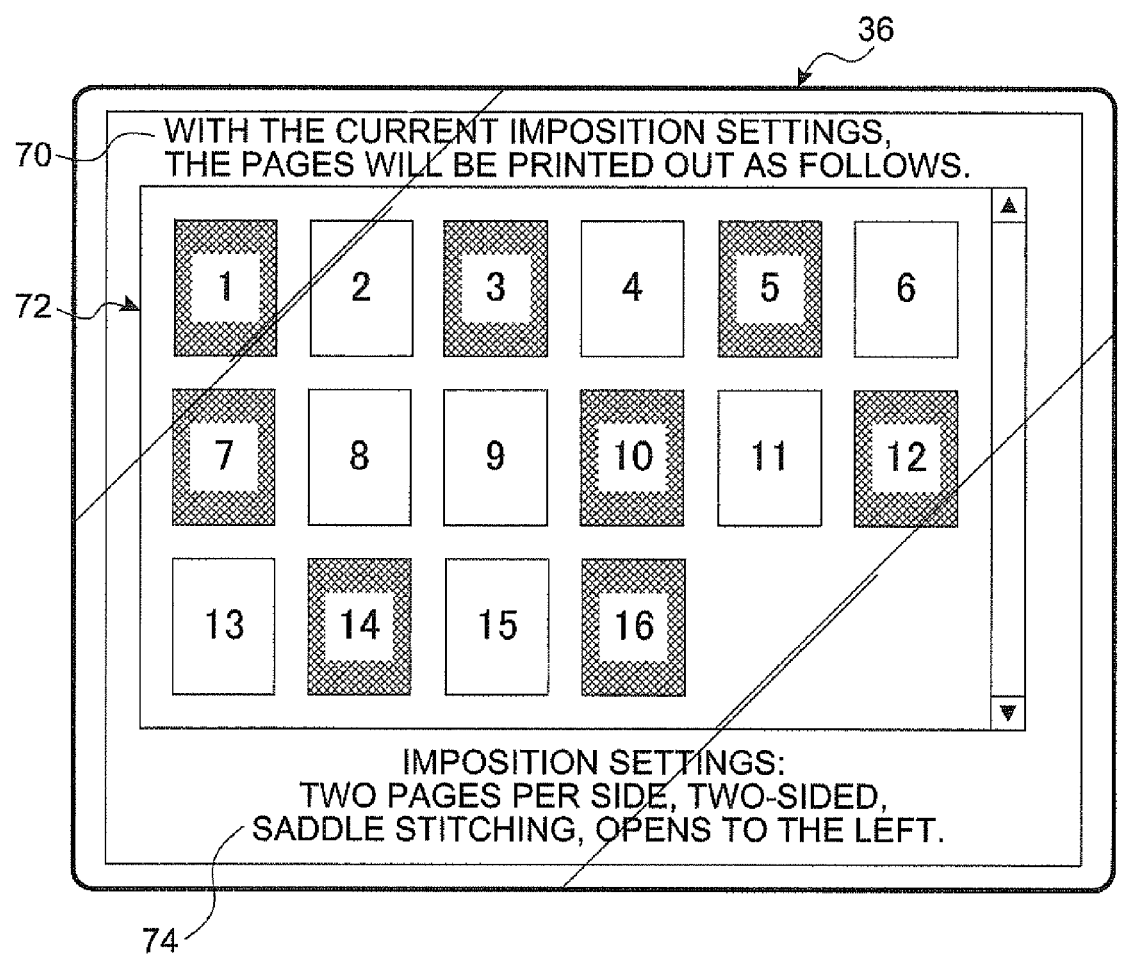
FIG. 6 is a front view of a display screen of a UI that illustrates a reporting mode of first print prediction information, relating to the first exemplary embodiment.

A first print prediction information reporting mode is constituted with, as illustrated in FIG. 6, a text image 70, an imposition image 72 and a text image 74, and is displayed at a display screen of the UI 36. The text image 70 indicates the subject matter (a message saying "With the current imposition settings, the pages will be printed out as follows."). The imposition image 72 arrays the logical pages 16R and distinguishes the logical pages 16R to be printed in color from the logical pages 16R to be printed in black and white. The text image 74 indicates details of the imposition settings (a message saying "Imposition settings: two pages per side, two-sided, saddle stitching, opens to the left.").

Figure 7:
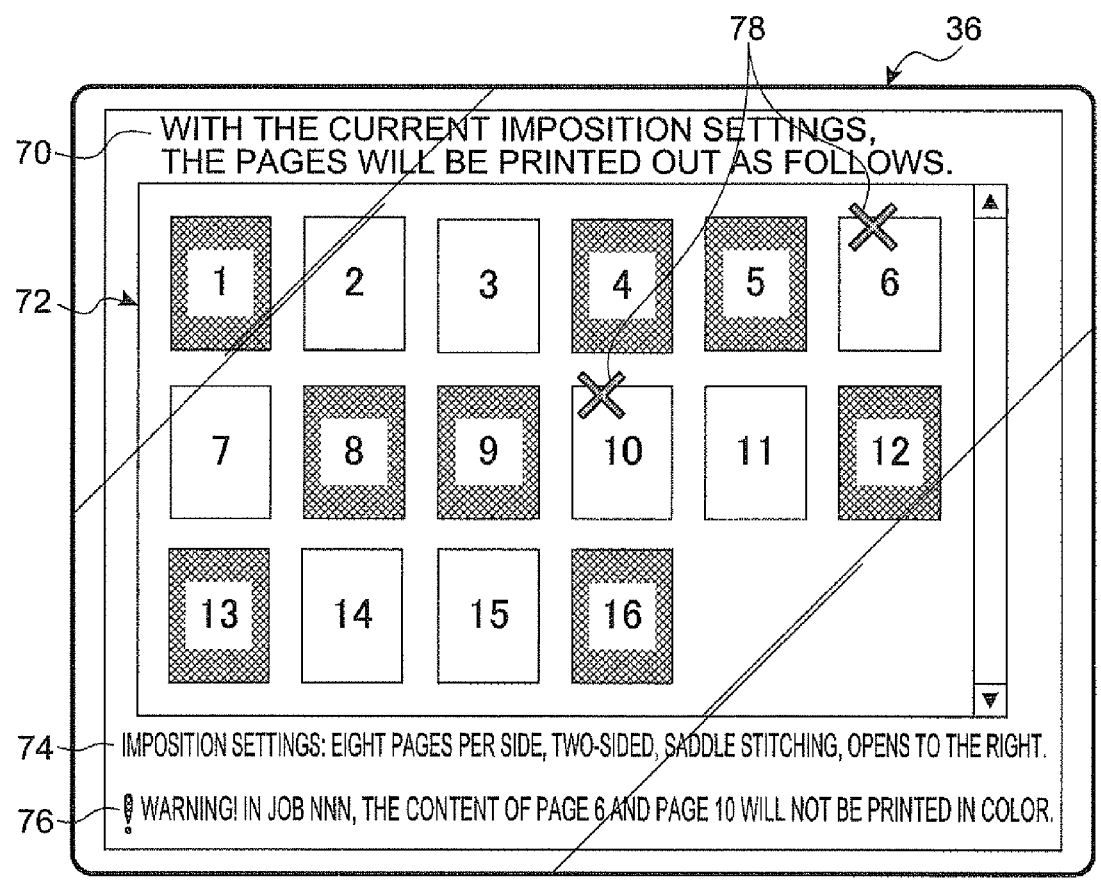
FIG. 7 is a front view of a display screen of a UI that illustrates a reporting mode of second print prediction information, relating to the first exemplary embodiment.

A second print prediction information reporting mode is constituted with, as illustrated in FIG. 7, the text image 70, the imposition image 72, the text image 74, a warning image 76 and marker images 78, and is displayed at the display screen of the UI 36. The text image 70 indicates the subject matter (the message saying "With the current imposition settings, the pages will be printed out as follows."). The imposition image 72 arrays the logical pages 16R and distinguishes the logical pages 16R to be printed in color from the logical pages 16R to be printed in black and white. The text image 74 indicates details of the imposition settings (a message saying "Imposition settings: two pages per side, two-sided, saddle stitching, opens to the right, bottom fold."). The warning image 76 ("Warning! In job NNN, the content of page 6 and page 10 will not be printed in color.") is displayed below the text image 74. The marker images 78, being superposed on the imposition image 72, mark the logical pages 16R that are specified by the warning image 76.

Figure 8:
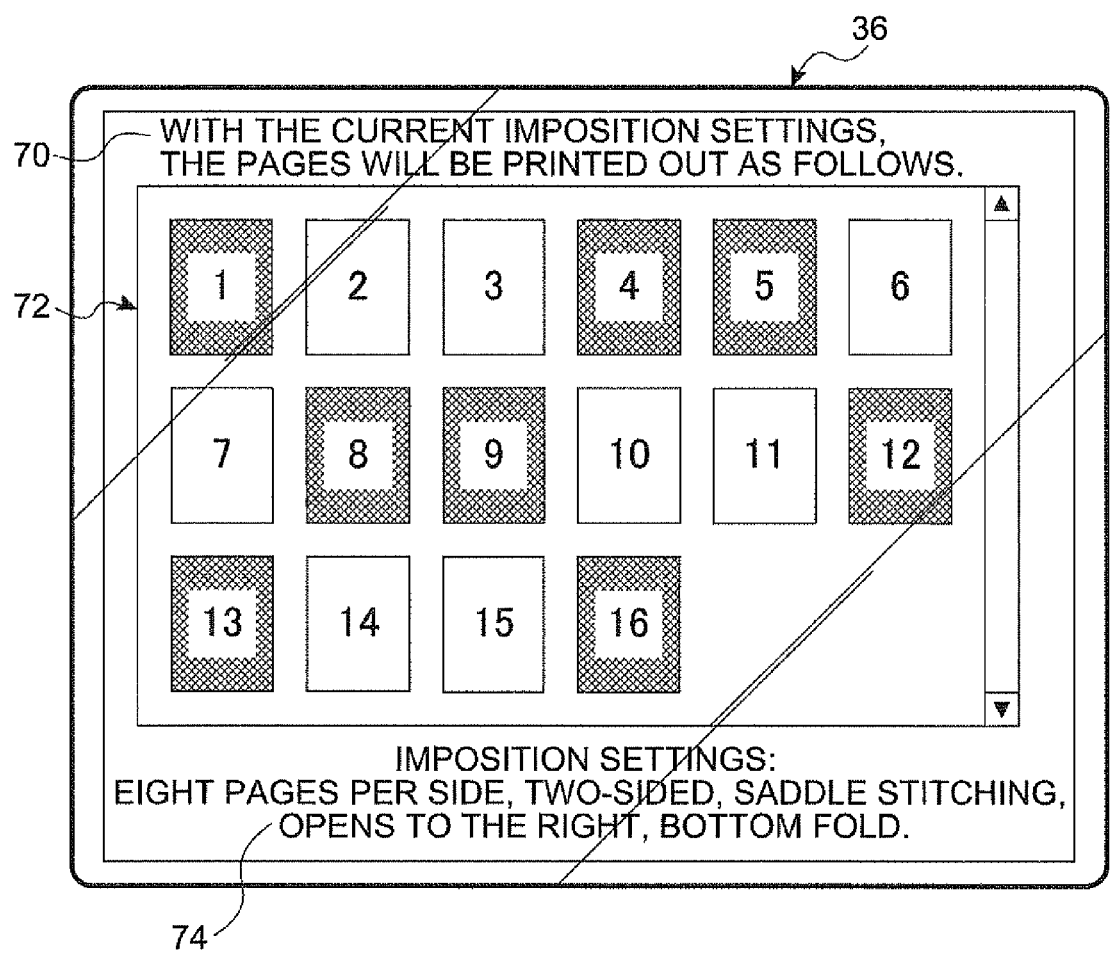
FIG. 8 is a front view of a display screen of a UI that illustrates a reporting mode of the first print prediction information (with the same imposition settings as in FIG. 7), relating to the first exemplary embodiment.

FIG. 8 illustrates a case in which the imposition settings reported for the second print prediction information reporting mode are reported in the first print prediction information reporting mode.

That is, the first print prediction information reporting mode and the second print prediction information reporting mode differ in whether or not it is actively reported when printing as requested is not possible, and may be selected by the user.

After the reporting of the printing information, a signal determining the possibility of the execution of printing is sent from the UI 36 to a raster image data output section 69.

At the raster image data output section 69, when an instruction for the execution of printing is received, the raster image data is read from the temporary storage section 60 and sent to the image formation control section 35. When an instruction that execution of the printing is not possible (stop) is received, the raster image data stored in the temporary storage section 60 is erased and the print request data is cancelled.

Operation of the first exemplary embodiment is described below in accordance with the flowchart of FIG. 9.

In step 100, as the default setting, the mode of reporting is set to "deployment and warning". The meaning of this term "deployment and warning" includes the above-described second print prediction information reporting mode, which is the text image 70 showing the subject matter, the imposition image 72, the text image 74 showing the imposition settings, the warning image 76 and the marker images 78 (see FIG. 7).

Then, in step 102, it is determined whether or not print request data has been received. If this determination is negative, the present routine ends.

If the determination of step 102 is affirmative, control passes to step 104, and attribute data and image data are extracted from the print request data.

Then, in step 106, with the extracted image data as the target, raster image processing is applied in accordance with the attribute data. This raster image processing is, specifically, processing to convert the extracted image data to image data (bitmap data or the like) to be deployed onto the recording paper 16.

Then, in step 108, the logical pages 16R are assigned to areas of the front and rear faces of the recording paper 16 on the basis of the imposition settings included in the attribute data. The logical pages 16R to be specified for the front and rear faces of the recording paper 16 are distinguished by this processing.

Then, in step 110, function data of the upstream printing device 12 and the downstream printing device 14 is acquired, and control passes to step 112.

In step 112, on the basis of information about the assignment of the logical pages 16R in step 108 and the function data acquired in step 110, processing that determines whether or not the assignment can match color image requests is executed.

Then, in step 114, it is determined whether or not there is a reporting mode instruction. A user may operate the UI 36 and instruct a reporting mode that they require, and this step identifies whether or not there is such an instruction. If the determination of step 114 is affirmative, control passes to step 116 and the instructed reporting mode is identified.

In step 116, if it is determined that the instructed reporting mode is the first print prediction information reporting mode, control passes to step 118, and if it is determined that the instructed reporting mode is the second print prediction information reporting mode, control passes to step 120. If the determination of step 114 is negative, that is, if there is no instruction from the user, the reporting mode of the default setting (see step 100) is used (the second print prediction information reporting mode), and control passes to step 120.

In step 118, a deployment image of the logical pages 16R is displayed in accordance with the first print prediction information reporting mode. That is, the image is displayed on the display screen of the UI 36 as in FIG. 6 or FIG. 8.

In other words, as illustrated in FIG. 6, the message "With the current imposition settings, the pages will be printed out as follows." is displayed as the text image 70 indicating the subject matter in an upper portion.

Below the text image 70, the imposition image 72 in which the logical pages 16R are arrayed and identified as color or black-and-white is displayed. The imposition image 72 may be displayed in its own window and, when there is a large number of pages, sequentially displayed in a scrolling format.

Below the (window of the) imposition image 72, as the text image 74 that shows the details of the imposition settings, a message saying "Imposition settings: two pages per side, two-sided, saddle stitching, opens to the left." is displayed.

FIG. 8 is based on the first print prediction information reporting mode, which is the display mode format, when the imposition settings is different from this.

When the above-described display is implemented in step 118, control passes to step 122 and it is determined whether or not printing is to continue. For this determination, it is assumed that the user is prompted to make the determination. In this case, if the user does not intervene, printing is not continued. Accordingly, a unit may be added that instructs the continuation of printing beforehand, sets an effective period of operations of a certain duration, or the like.

If the determination of step 122 is affirmative, the printing is to continue, and control passes to step 132. If the determination of step 122 is negative, control passes to step 124, processing to cancel the print request data is performed, and the present routine ends.

On the other hand, if "deployment and warning" (the second print prediction information reporting mode) is employed as the reporting mode, control passes from step 114 or step 116 to step 120, and in step 120, it is determined whether or not color image requests are matched. If the determination in step 120 is affirmative, control passes to step 132.

If the determination in step 120 is negative, control passes to step 126, and a deployment image of the logical pages 16R is displayed in accordance with the second print prediction information reporting mode. That is, the images are displayed on the display screen of the UI 36 as illustrated in FIG. 7.

In other words, as illustrated in FIG. 7, the message "With the current imposition settings, the pages will be printed out as follows." is displayed as the text image 70 indicating the subject matter in the upper portion.

Below the text image 70, the imposition image 72 in which the logical pages 16R are arrayed and identified as color or black-and-white is displayed. The imposition image 72 may be displayed in its own window and, when there is a large number of pages, sequentially displayed in a scrolling format.

Below the (window of the) imposition image 72, as the text image 74 that shows the details of the imposition settings, a message saying "Imposition settings: eight pages per side, two-sided, saddle stitching, opens to the right, bottom fold." is displayed. In addition, a message saying "Warning! In job NNN, the content of page 6 and page 10 will not be printed in color." is displayed below the text image 74 as the warning image 76. The logical pages 16R that are specified by this warning image 76 have the marker images 78 added, superposed on these logical pages 16R that are being displayed in the imposition image 72. The marker images 78 are crossmarks in the first exemplary embodiment but are not particularly to be limited to this symbol. It is sufficient if the marker images 78 are relatively clearly distinctive within a range that can be viewed. Density, color and the like of regions of the logical pages 16R may also be changed.

When the above-described display is implemented in step 126, control passes to step 128 and it is determined whether or not printing is to continue. For this determination, it is assumed that the user is prompted to make the determination.

If the determination of step 128 is affirmative, the printing is to continue, and control passes to step 132. If the determination of step 128 is negative, control passes to step 130, processing to cancel the print request data is performed, and the present routine ends.

In step 132, for the printing that is to be executed, first, raster image data corresponding to the logical pages 16R at the rear face is transmitted to the printing device 14. Then control passes to step 134 and printing processing is executed on the basis of raster image data corresponding to the logical pages 16R at the front face, and the present routine ends.

—Flow of Processing Based on Imposition Settings—

Figure 10:
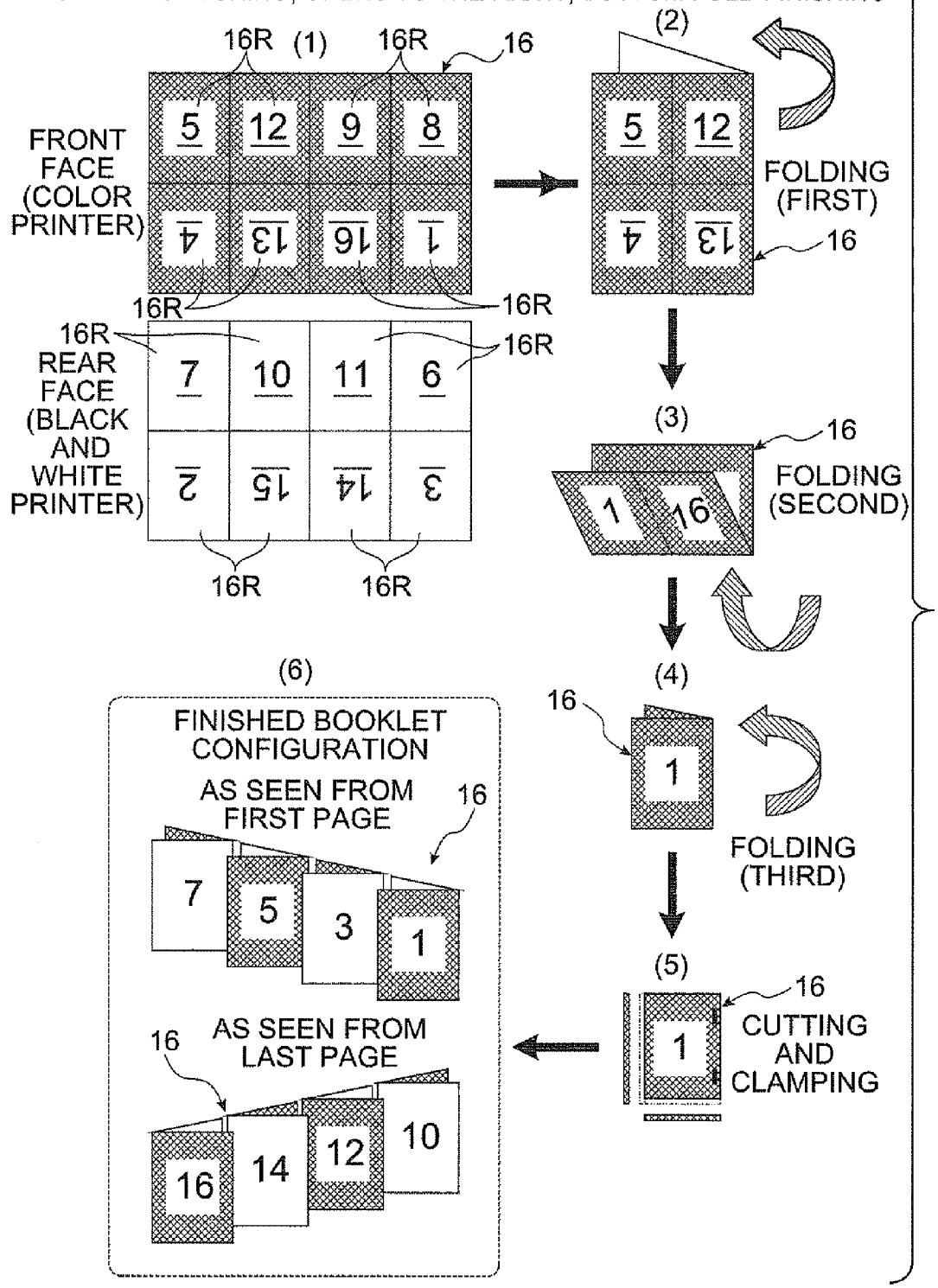
FIG. 10 is a flow diagram illustrating a process relating to the first exemplary embodiment, of assigning logical pages to front and rear faces of recording paper on the basis of the imposition settings, through plural folding steps, and cutting and binding steps, to book making.

FIG. 10 is a flow diagram illustrating a process, using the recording paper 16 after the printing processing, of assigning the logical pages 16R to the front and rear faces of the recording paper 16 on the basis of the imposition settings, through plural folding steps and cutting and binding steps, to book making, illustrated herebelow.

(1) Imposition Settings

Eight pages per side, two-sided (16 pages), saddle stitching, opens to the right, bottom fold finishing These imposition settings correspond to the aforementioned arrangement in FIG. 8 displayed in the display screen of the UI 36.

(2) FIG. 10 (1) illustrates the front and rear faces of the recording paper 16 (the upper side is the front face and the lower side is the rear face). The logical pages 16R are assigned on the basis of these imposition settings.

(3) FIG. 10 (2) to (4) illustrate three folding steps. Thus, the logical pages 16R are separated.

(4) FIG. 10 (5) illustrates cutting and binding steps. "Double-leaved" end portions are cut off by the cutting, two sheets of the recording paper 16 are divided into four sheets by the cutting, and this is bound with a binding member.

(5) FIG. 10 (6) is a deployment view of the finished booklet configuration, which is finished in a state in which the logical pages 16R are correctly sequenced.

—First Variant Example—

Figure 9:
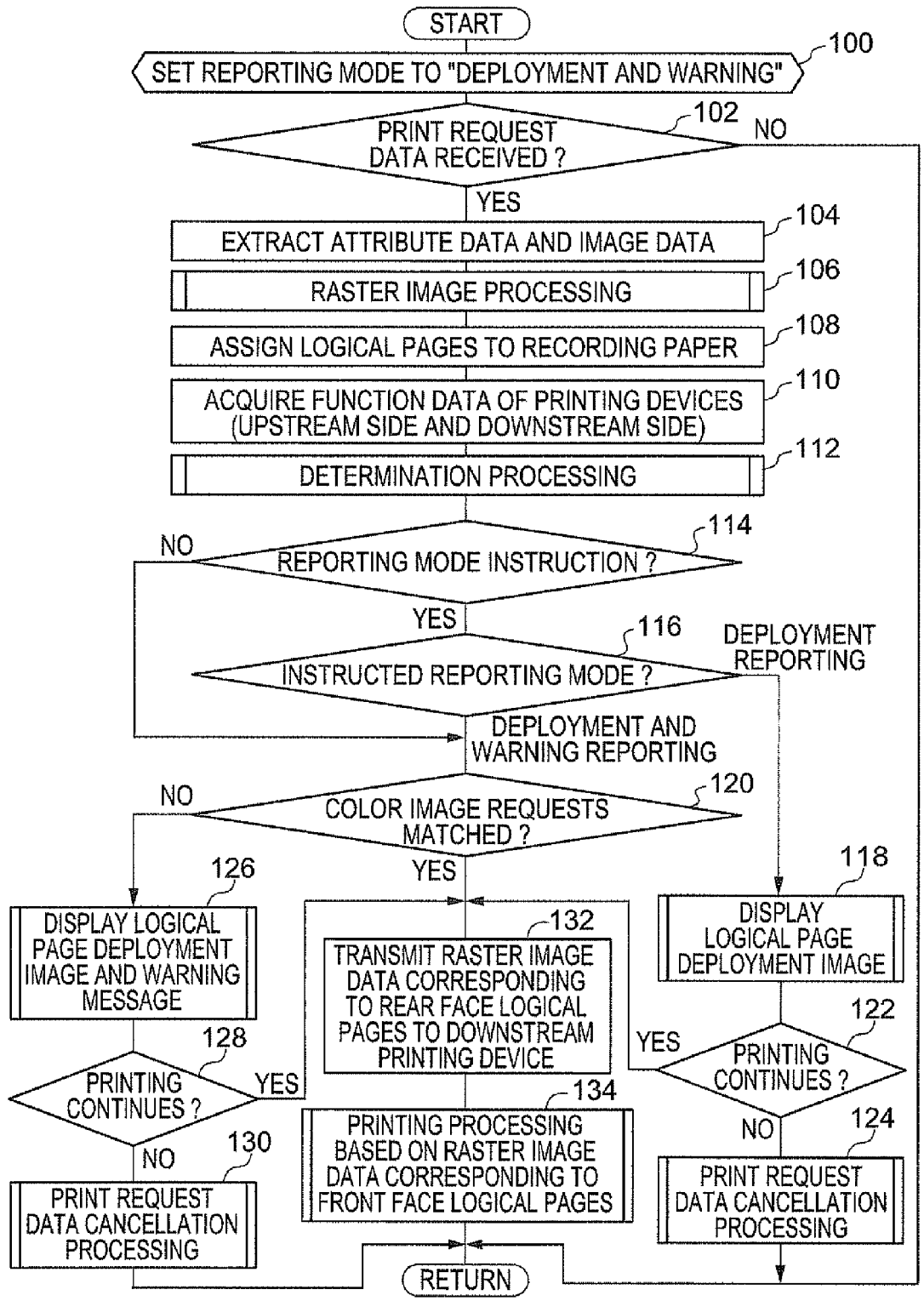
FIG. 9 is a flowchart illustrating a printability determination control routine based on the imposition settings, relating to the first exemplary embodiment.
Figure 11:
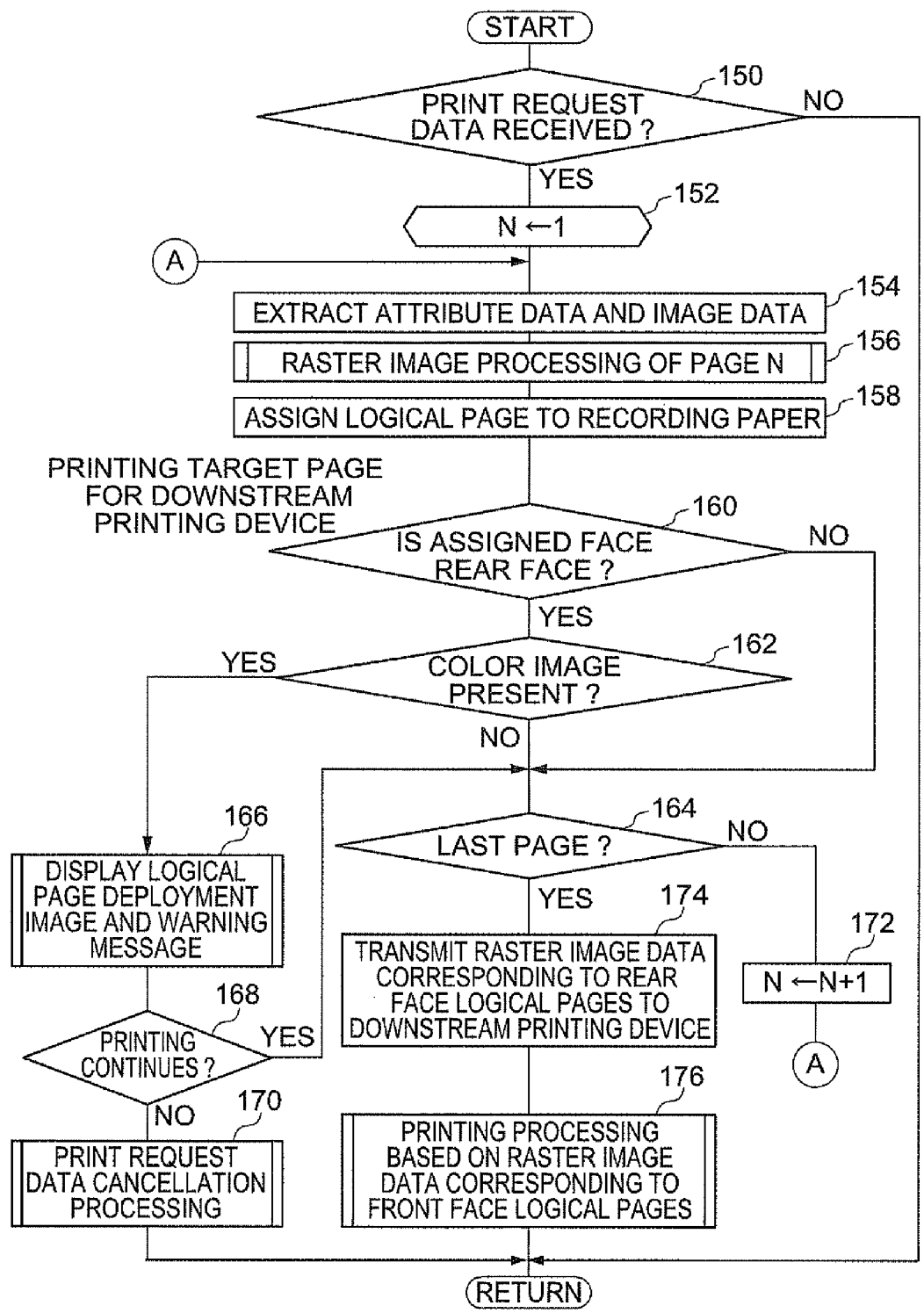
FIG. 11 is a flowchart illustrating a printability determination control routine based on imposition settings, relating to a first variant of the first exemplary embodiment.

In the flowchart of FIG. 9 relating to the first exemplary embodiment, all the image data in the print request data (all the logical pages 16R) is deployed onto the recording paper 16, and the possibility of the requested printing is determined. However, the possibility of the requested printing may be determined for each logical page 16R. In this case, it is assumed that there are warnings. FIG. 11 is a flowchart illustrating a warning processing routine for units of the logical pages 16R.

In step 150, it is determined whether or not print request data has been received. If this determination is negative, the present routine ends.

If the determination of step 150 is affirmative, control passes to step 152 and a variable N is set to 1. Then control passes to step 154 and the attribute data and image data are extracted from the print request data.

Then, in step 156, with the extracted image data as the target, raster image processing is applied in accordance with the attribute data. This raster image processing is, specifically, processing to convert the extracted image data to image data (bitmap data or the like) to be deployed onto the recording paper 16.

Then, in step 158, the logical pages 16R are assigned to either of the front and rear faces of the recording paper 16 on the basis of the imposition settings included in the attribute data. The logical pages 16R to be specified for the front and rear faces of the recording paper 16 are distinguished by this processing.

Then, in step 160, it is determined whether or not an assigned face is the rear face, that is, whether or not a printing target page will be from the printing device 14. If the determination of step 160 is affirmative, control passes to step 162, and it is determined whether or not a color image is present in the assigned logical page 16R.

If the determination of step 160 is negative, or if the determination of step 162 is negative, control passes to step 164.

If the determination of step 162 is affirmative, control passes to step 166, and the text image 70, imposition image 72, text image 74, warning image 76 and marker images 78 are displayed on the display screen of the UI 36. As the warning image 76, a message saying "Warning! In job NNN, the content of page N will not be printed in color." is displayed.

When the above-described display is implemented in step 166, control passes to step 168 and it is determined whether or not printing is to continue. For this determination, it is assumed that the user is prompted to make the determination.

If the determination of step 168 is affirmative, the printing is to continue, and control passes to step 164. If the determination of step 168 is negative, control passes to step 170, processing to cancel the print request data is performed, and the present routine ends.

Otherwise, in step 164, it is determined whether or not the page is the last page. If this determination is negative, control passes to step 172, the variable N is implemented (N←N+1), control returns to step 154 and the above procedure is repeated. That is, it is determined whether or not color image requests will be matched for each individual page of the logical pages 16R.

When the determination of step 164 is affirmative, control passes to step 174. Then, for the printing that is to be executed, first, raster image data corresponding to the logical pages 16R at the rear face is sent to the printing device 14. Then control passes to step 176 and printing processing is executed on the basis of raster image data corresponding to the logical pages 16R at the front face, and the present routine ends.

—Second Variant Example—

The above-described first exemplary embodiment and first variant example describe processing when the print request data is actually received. In the second variant example however, simulated determination (a simulation) is executed when there is imposition settings but no actual print request data.

Figure 12:
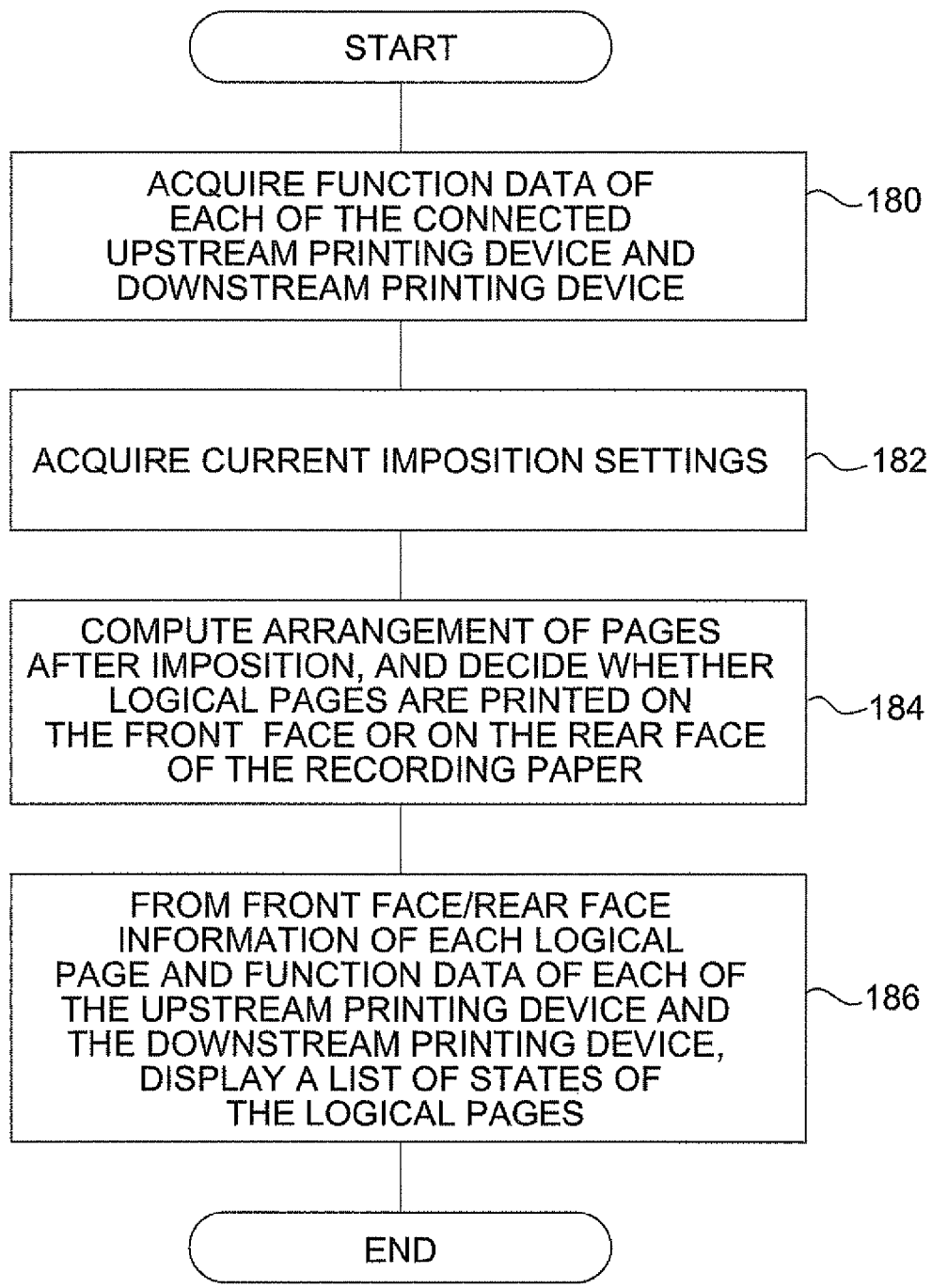
FIG. 12 is a flowchart illustrating a printability determination control routine based on imposition settings, relating to a second variant of the first exemplary embodiment.

As illustrated in FIG. 12, in step 180, function data of each of the connected upstream printing device 12 and downstream printing device 14 is acquired. Then, in step 182, the current imposition settings is acquired, and control passes to step 184.

In step 184, an arrangement of pages after imposition is computed, and it is decided whether each logical page 16R would be printed on the front face or the rear face of the recording paper 16. Then, control passes to step 186 and, from front face/rear face information of each logical page 16R and function data of each of the upstream printing device 12 and the downstream printing device 14, states of the logical pages 16R are displayed in a list.

In the first exemplary embodiment, the first variant example and the second variant example, matching with color printing or non-matching with color printing (i.e., being limited to black-and-white printing), which is the difference between the functions of the upstream printing device 12 and the downstream printing device 14, is determined and, if printing of a logical page with a color image at the downstream printing device 14 that is limited to black-and-white printing is requested, a warning is given. However, a difference between the respective printing functions is not to be limited to color versus black-and-white; distinctions may be made for a difference in resolution (for example, one has a maximum resolution of 1200 dpi and the other has a maximum of 600 dpi), a difference between fonts (whether a specific font is available or not) and the like, and other functional differences. Furthermore, plural functional differences may be monitored in combination.

—Second Exemplary Embodiment—

Herebelow, a second exemplary embodiment is described. The characteristic of the second exemplary embodiment is that the simulated determination (simulation) of the second variant example of the first exemplary embodiment described above is employed and determination results are displayed at a monitor screen of the terminal device 44.

Figure 13:
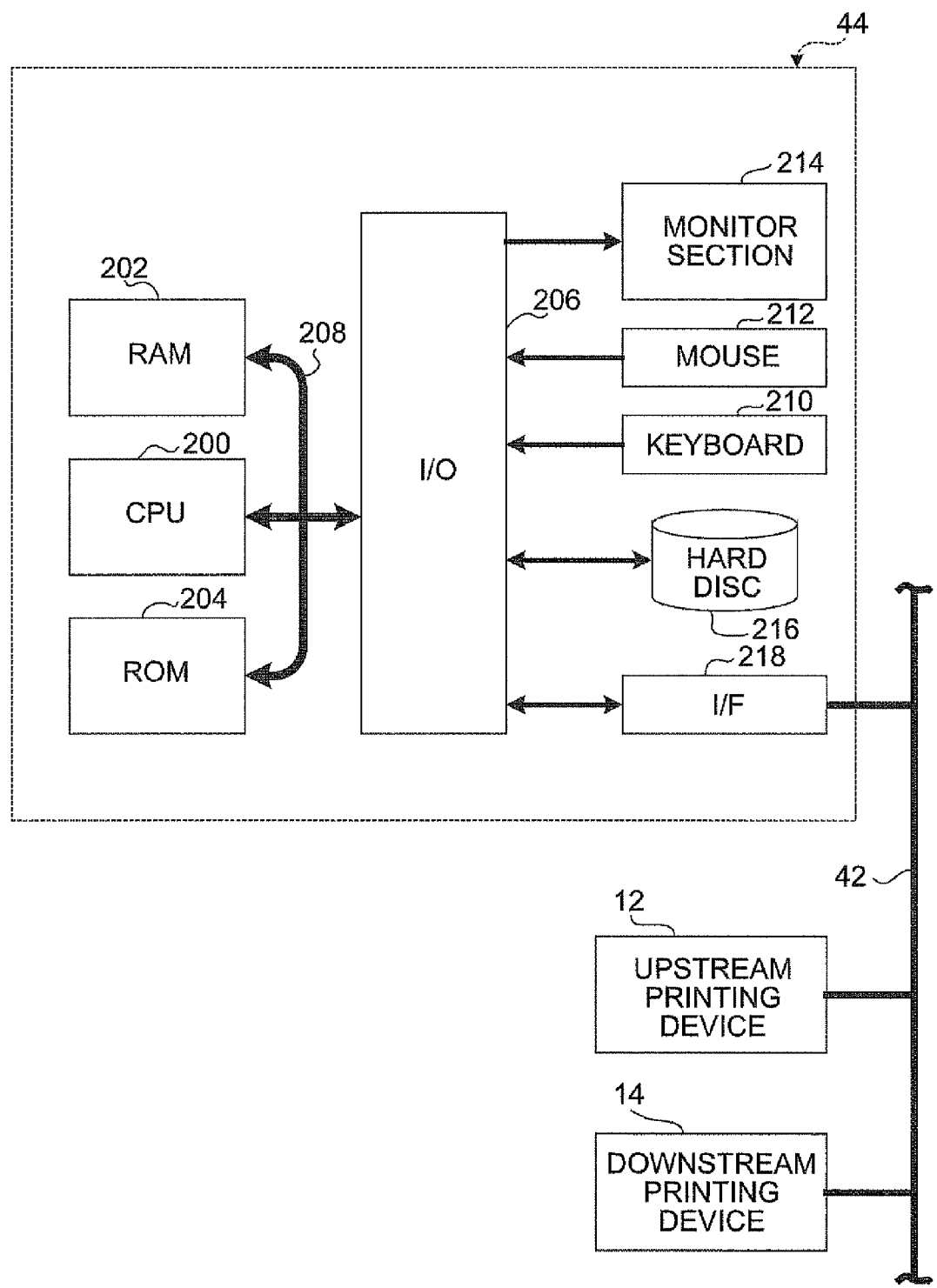
FIG. 13 is a block diagram illustrating hardware structure of an information processing device relating to a second exemplary embodiment.

As illustrated in FIG. 13, the terminal device 44 includes a CPU 200, a RAM 202, a ROM 204, an input/output section (I/O) 206, and a bus 208 connecting the above, such as a data bus, a control bus or the like.

A printer driver program for controlling operations of the upstream printing device 12 and the downstream printing device 14 and executing processing is installed in advance in the ROM 204. The CPU 200 controls the execution of printing processing on the basis of the printer driver program stored in the ROM 204.

The printer driver program may be recorded on a recording medium such as a CD-ROM or the like, and may be transmitted through a network.

A keyboard 210 and a mouse 212 are connected to the I/O 206 to serve as an input system. A monitor section 214 is also connected to the I/O 206 to serve as an output system.

The keyboard 210 and mouse 212 or the like accept input operations from a user, and the monitor section 214 has the function of reporting performance conditions to the user in accordance with the input operations.

A hard disc 216 is connected to the I/O 206. The I/O 206 is also connected to the communications network 42 via an I/F 218.

The communications network 42 is connected to the upstream printing device 12 and the downstream printing device 14 as described above. When the printer driver program operates, respective attribute data (data relating to printing functions including at least data specifying the possibility of color printing) may be acquired from the upstream printing device 12 and the downstream printing device 14 via the communications network 42.

That is, when image data is obtained and a print request is received by the CPU 200, a simulated imposition of the logical pages 16R is executed on the basis of the print request. At this time in the first exemplary embodiment, raster image processing (RIP) is actually executed at the printing device receiving the print request (the upstream printing device 12 and/or the downstream printing device 14) and then the results (see FIG. 6 to FIG. 8) are displayed on the UI 36 (see FIG. 3). In this second exemplary embodiment however, the simulated imposition is carried out before the raster image processing.

Accordingly, although the display results are the same as in the first exemplary embodiment, if printing as requested is not possible in itself (color printing is not possible) as illustrated in FIG. 7, editing to change the pattern of imposition or switch around the logical pages 16R is simpler.

Figure 14:
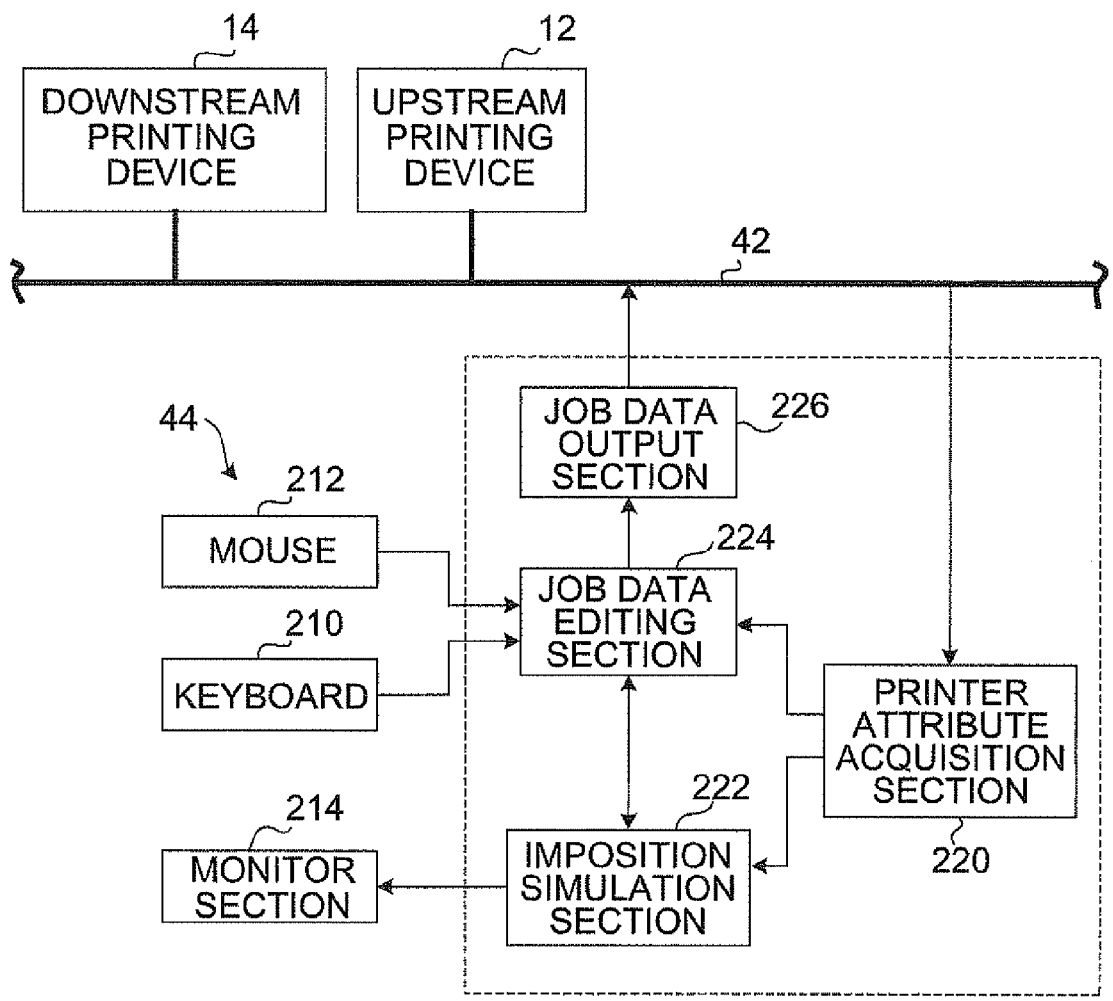
FIG. 14 is a functional block diagram for executing imposition simulation, which is executed by a CPU of the information processing device relating to the second exemplary embodiment.

FIG. 14 is a functional block diagram for imposition setting by running the printer driver program, which is executed by the CPU 200 of the terminal device 44.

A printer attribute acquisition section 220 acquires respective printing attribute data from the home printing device function data memory 66 (see FIG. 5) of each of the upstream printing device 12 and downstream printing device 14 connected to the communications network 42.

The printer attribute acquisition section 220 is connected to an imposition simulation section 222 and a job data editing section 224, and sends the acquired attribute data of the printing devices thereto. The imposition simulation section 222 is connected to the job data editing section 224.

In accordance with operations of the keyboard 210 and mouse 212, the job data editing section 224 receives image data recorded in a recording medium such as the ROM 204, the hard disc 216 or the like or image data acquired through the communications network 42, and performs editing, adding printing attribute data for printing and the like. This printing attribute data includes imposition settings.

The job data edited at the job data editing section 224 is sent to the upstream printing device 12 via a job data output section 226.

Before the job data edited by the job data editing section 224 is sent to the job data output section 226, simulated imposition processing is computed at the imposition simulation section 222 in accordance with the imposition settings, and the logical pages 16R are assigned to the front and rear faces of each recording paper.

Results of this simulation (imposition results) are displayed at the monitor section 214. The information displayed at the monitor section 214 is similar to FIG. 6 to FIG. 8 shown in the first exemplary embodiment, and is not described here.

The imposition state displayed at the monitor section 214 may be viewed by a user. Hence, for example, if it is clarified beforehand that printing as requested is not possible (color printing is not possible) as illustrated in FIG. 7, operations may be inputted in response, for example, to switch around the logical pages 16R or change the imposition settings, and re-editing may be done before the job data is sent to the upstream printing device 12.

Herebelow, operation of the second exemplary embodiment (flow of the imposition simulation at the terminal device 44) is described in accordance with the flowchart of FIG. 15.

In step 250, it is determined whether or not there is a print instruction. If this determination is negative, the present routine ends.

If the determination of step 250 is affirmative, control passes to step 252 and image data is acquired. Then, in step 254, attribute data (principally information on the possibility of color printing) of the upstream printing device 12 and the downstream printing device 14 is acquired, and control passes to step 256.

In step 256, attributes based on the print instruction (for example, a number of pages, imposition information and the like) is read. In step 258, the imposition simulation is executed.

Then, in step 260, the results of the imposition simulation of step 258 are displayed on the monitor section 214. Specifically, the results are similar to the deployment images of the logical pages 16R as illustrated in FIG. 6 to FIG. 8 shown in the first exemplary embodiment. A user may recognize, by looking at this FIG. 6 to FIG. 8, a state in which the logical pages 16R for which color printing is requested may not be printed as requested (i.e., are matched up with a printing device for black-and-white only) or suchlike before the job data is sent to the printing devices.

In step 262, it is determined whether or not changes in imposition or the like or in the assignment of logical pages or the like have been instructed. If this determination is negative, control passes to step 264, and it is determined whether or not a printing execution instruction has been given. If the determination in step 264 is negative, control returns to step 262, and steps 262 and 264 are repeated until the determination of either of steps 262 and 264 is affirmative.

If the determination of step 262 is affirmative, that is, if there is a change instruction, control passes to step 266 and re-editing processing is performed. Then, control returns to step 258 and the above procedure is repeated.

If the determination of step 264 is affirmative, that is, when there is a printing execution instruction, control passes to step 268, job data is transmitted to the printing devices, and the present routine ends.

In the present exemplary embodiment, the above-described display control is executed in addition to the execution of the control processing based on the printer driver program stored in the ROM 204. However, the display control may be executed on the basis of a separate application program from the printer driver program. In this case, the display control may be linked with the printer driver program, that is, synchronized with a print instruction, or a simulation of imposition or the like may be performed by itself, separately from the print instruction.

What is claimed is:

1. An image forming device comprising:
a first image forming unit that forms an image on one of either a front face or a back face of a recording medium in a single pass;
a second image forming unit that receives the recording medium from the first image forming unit and forms an image at the other of the front face or the back face of the received recording medium in the single pass, and that performs image formation of a type that differs from image formation performed by the first image forming unit;
an assignment unit that assigns each of logical pages of image data of a printing target to one of the first image forming unit and the second image forming unit; and
a reporting unit that reports, on a display screen of a user interface, image forming information indicating what type of image formation is to be performed on the each logical page of the image data that is assigned by the assignment unit to one of the first image forming unit and the second image forming unit.

2. The image forming device according to claim 1, wherein the assignment unit performs imposition processing that assigns respective pluralities of the logical pages to the front face and the back face of the recording medium.

3. The image forming device according to claim 1, further comprising:
a determination unit that, before image formation is executed by the first image forming unit, determines whether or not processing relating to the image formation, which is specified by the image data of the each logical page assigned by the assignment unit, is executable at each of the first image forming unit and the second image forming unit,
wherein the reporting unit reports determination results of the determination unit.

4. The image forming device according to claim 3, wherein the image forming information includes information indicating that color image formation is to be performed or that black-and-white image formation is to be performed, and
before the first image forming unit or the second image forming unit forms an image, the reporting unit reports, for the image data, the information indicating that color image formation is to be performed or that black-and-white image formation is to be performed.

5. The image forming device according to claim 4, wherein the determination unit determines, for the image data of each of the logical pages, a possibility of execution of image formation on each of the first image forming unit and the second image forming unit, and
the reporting unit displays the determination result for the image data of each of the logical pages superposed on top of an array of images of the logical pages.

6. An image forming system comprising:
the image forming device of claim 1, the first image forming unit and the second image forming unit being separate devices covered by separate casing bodies; and
a conveyance unit that is interposed between the separate devices for transferring the recording medium therebetween, wherein
at least the assignment unit and the determination unit are included in one of the separate devices that is disposed at one of an upstream side and a downstream side in a conveyance direction of the recording medium.

7. A non-transitory computer readable medium storing a program causing a computer to execute a process for determining a possibility of image formation in an image forming device or image forming system, the image forming device or image forming system including a first image forming unit that forms an image on one of either a front face or a back face of a recording medium in a single pass, and a second image forming unit that receives the recording medium from the first image forming unit and forms an image at the other of the front face or the back face of the received recording medium in the single pass, and that provides a function that differs from a function relating to image formation that the first image forming unit provides, the process comprising:

assigning image data of logical page units that are included in print request data receiving a request to one of the first image forming unit and the second image forming unit; and before image formation is executed by the first image forming unit, determining whether or not processing based on a function relating to the image formation, which is specified in the image data of the each assigned logical page, is executable at each of the first image forming unit and the second image forming unit.

8. The non-transitory computer readable medium according to claim 7, wherein assigning includes imposition processing for assigning respective pluralities of the logical pages to the front face and the back face of the recording medium.

9. The non-transitory computer readable medium according to claim 7, the process further comprising:

reporting results of the determining step on a display screen of a user interface.

10. The non-transitory computer readable medium according to claim 9, wherein the reporting results step includes displaying the determination result for each of the image data of the logical pages superposed on top of an array of images of the logical pages.

11. The non-transitory computer readable medium according to claim 10, wherein the determining step includes determining, for the image data of each of the logical pages, a possibility of execution of image formation on each of the first image forming unit and the second image forming unit, and the reporting step includes displaying the determination result for the image data of each of the logical pages superposed on top of an array of image data of the logical pages.

12. An information processing device that performs information processing in relation to an image forming device or image forming system, the image forming device or image forming system including a first image forming unit that forms an image on one of either a front face or a back face of a recording medium in a single pass, and a second image forming unit that receives the recording medium from the first image forming unit and forms an image at the other of the front face or the back face of the received recording medium in the single pass, and that performs image formation of a type that differs from image formation performed by the first image forming unit, and the information processing device comprising:

a processing function data acquisition unit that acquires information relating to image formation processing functions from the first image forming unit and the second image forming unit;

an assignment simulation unit that executes a simulation that assigns each image data of the logical pages of a printing target to one of the first image forming unit and the second image forming unit; and a reporting unit that reports, on a display screen of a user interface, image forming information indicating what type of image formation is to be performed on the each image data of the logical pages assigned to one of the first image forming unit and the second image forming unit by the assignment simulation unit.

13. The information processing device according to claim 12, wherein the assignment simulation unit performs imposition processing that assigns respective pluralities of the logical pages to the front face and the back face of the recording medium.

14. The information processing device according to claim 12, further comprising:

a determination unit that, before job data is transmitted, determines whether or not processing relating to the image formation, which is specified by the image data of the each logical page assigned by the assignment simulation unit, is executable at each of the first image forming unit and the second image forming unit, wherein the reporting unit reports determination results of the determination unit.

15. The information processing device according to claim 12, wherein the image forming information includes information indicating that color image formation is to be performed or that black-and-white image formation is to be performed, and before job data is transmitted, the reporting unit reports, for the image data of each of the logical pages, the information indicating that color image formation is to be performed or that black-and-white image formation is to be performed.

16. The information processing device according to claim 15, wherein the determination unit determines a possibility of execution of image formation for the image data of each of the logical pages, and the reporting unit displays the determination result for the image data of each of the logical pages superposed on top of an array of images of the logical pages.

* * * * *